(12) United States Patent
Ottenhues et al.

(10) Patent No.: US 8,428,820 B2
(45) Date of Patent: Apr. 23, 2013

(54) PATH PLANNING

(75) Inventors: Thomas Ottenhues, Hörstel (DE); Peter Magyar, Oerlinghausen (DE); Joachim Wassmuth, Paderborn (DE); Norbert Höver, Lippstadt (DE); Sven Heinig, Oberlungwitz (DE)

(73) Assignee: Hella KGAA Huek and Co., Lippstadt (DE)

( * ) Notice: Subject to any disclaimer, the term of this patent is extended or adjusted under 35 U.S.C. 154(b) by 1267 days.

(21) Appl. No.: 12/096,329

(22) PCT Filed: Dec. 7, 2006

(86) PCT No.: PCT/EP2006/069411
§ 371 (c)(1),
(2), (4) Date: Jun. 5, 2008

(87) PCT Pub. No.: WO2007/065923
PCT Pub. Date: Jun. 14, 2007

(65) Prior Publication Data
US 2008/0255728 A1 Oct. 16, 2008

(30) Foreign Application Priority Data
Dec. 9, 2005 (DE) .......................... 10 2005 058 809

(51) Int. Cl.
*G05D 1/02* (2006.01)
(52) U.S. Cl.
USPC ................ 701/41; 701/23; 701/26; 701/300; 701/301

(58) Field of Classification Search ..................... 701/23, 701/25, 26, 41, 300, 301; 700/253, 255
See application file for complete search history.

(56) References Cited

U.S. PATENT DOCUMENTS

| 5,765,116 A * | 6/1998 | Wilson-Jones et al. ......... 701/41 |
| 6,922,606 B1 * | 7/2005 | Yutkowitz ..................... 700/187 |
| 7,103,461 B2 * | 9/2006 | Iwazaki et al. .................. 701/41 |
| 7,469,765 B2 * | 12/2008 | Spannheimer et al. ....... 180/204 |
| 7,487,020 B2 * | 2/2009 | Iwazaki et al. .................. 701/41 |

FOREIGN PATENT DOCUMENTS

| DE | 2901504 B1 | 6/1980 |
| DE | 4124654 A1 | 1/1993 |
| DE | 10114412 C1 | 11/2002 |
| DE | 10156067 A1 | 5/2003 |
| WO | 2004050458 A | 6/2004 |

* cited by examiner

*Primary Examiner* — Thomas Black
*Assistant Examiner* — Peter D Nolan
(74) *Attorney, Agent, or Firm* — Husch Blackwell LLP; Robert C. Haldiman; H. Frederick Rusche

(57) ABSTRACT

The present invention relates to a method of determining the path of a vehicle along a two-dimensional plane intended to control the movement of the vehicle by means of a driver-assisting system, where the path interconnects an initial state and a terminal state and each of the states $Z_i=[x_i, y_i, \psi_i, c_i]$ along the path is characterized by four state coordinates with $x_i$ and $y_i$ being the Cartesian coordinates of a point $P_i$, $\psi_i$ being the direction angle of the tangent line, and $c_i$ being the curvature of the path at point $P_i$, and where the path is made up of a number of elementary paths meeting at junction points $JP_i$ such that the four state coordinates of state $Z_i$ are characterized by a continuous transition at the junction points $JP_i$.

20 Claims, 9 Drawing Sheets

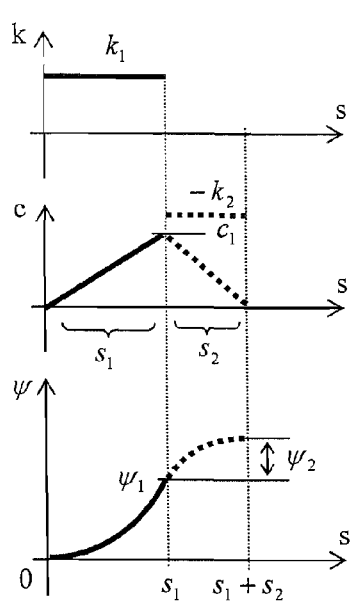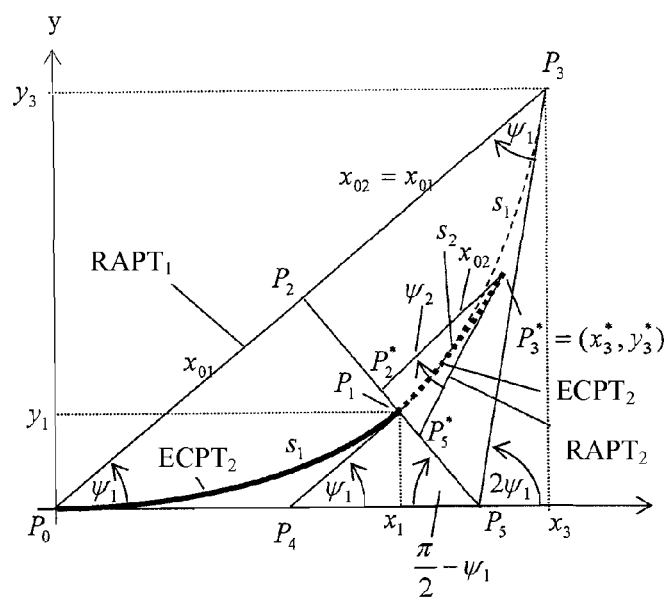
Fig. 1
Fig. 2

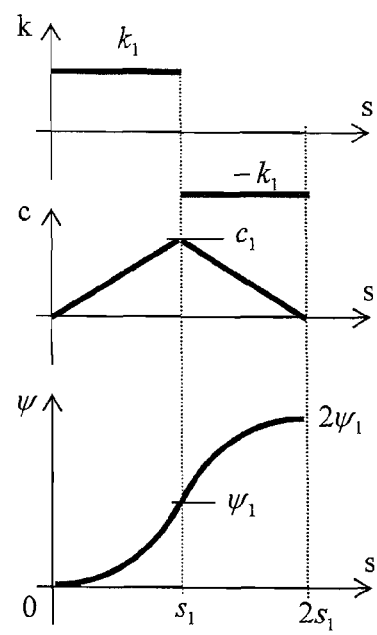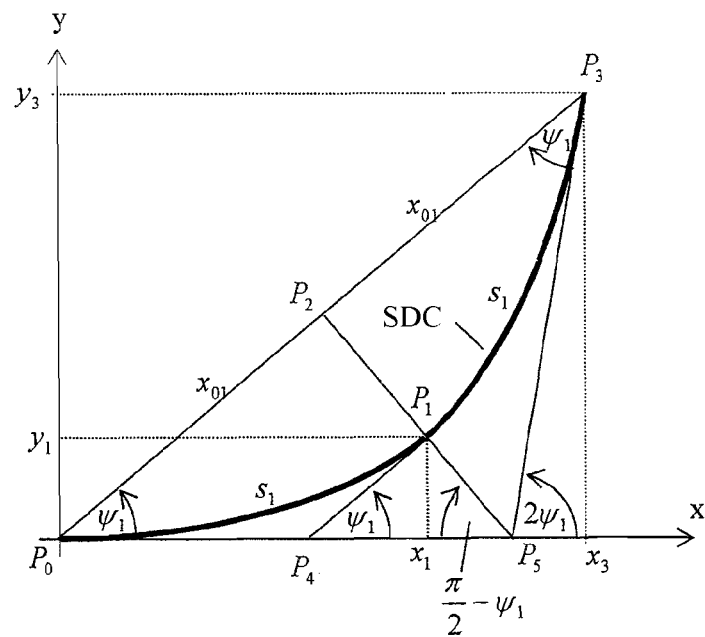
Fig. 3                              Fig. 4

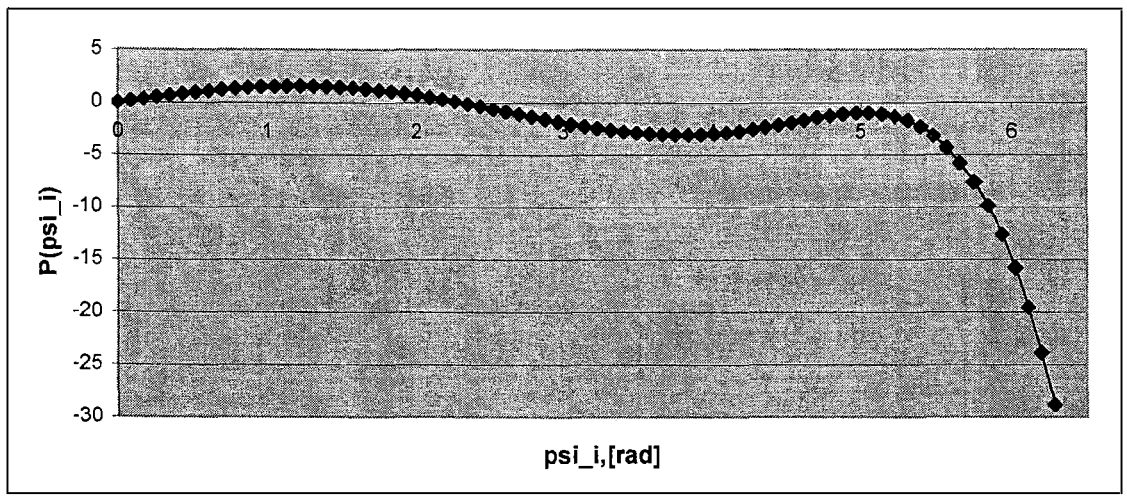
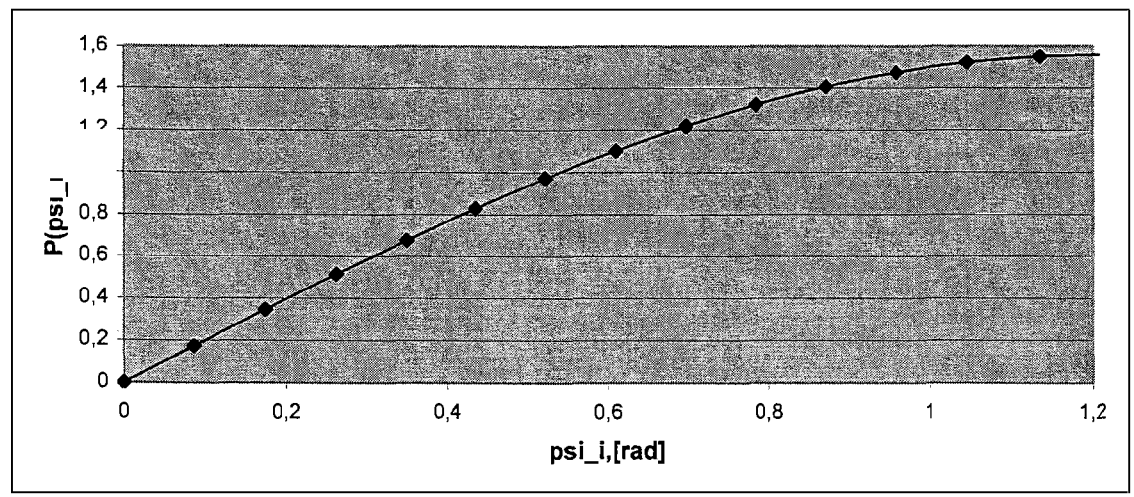
Fig. 7

PATH PLANNING

The present invention relates to a method of determining the path of a vehicle along a two-dimensional plane intended to control the movement of the vehicle by means of a driver-assisting system, where the path interconnects an initial state and a terminal state and each of the states $Z_i=[x_i, y_i, \psi_i, c_i]$ along the path is characterized by four state coordinates with $x_i$ and $y_i$ being the Cartesian coordinates of a point $P_i$, $\psi_i$ being the direction angle of the tangent line, and $c_i$ being the curvature of the path at point $P_i$, and where the path is made up of a number of elementary paths meeting at junction points $JP_i$ such that the four state coordinates of state $Z_i$ are characterized by a continuous transition at the junction points $JP_i$.

PRIOR ART

The prior art basically knows methods of determining a path of a vehicle steered along a two-dimensional plane. Both practical experience and technical literature present a variety of such methods of open loop and/or closed loop control of moving objects, motor vehicles, robots and so on by defining a nominal distance of a path to be traveled from which the path along a two-dimensional plane is systematically planned.

A typical example would be the path planning needed to maneuver a steered motor vehicle into a parking space with the aid of driver-assisting and parking assistant systems.

A fundamental objective of path planning is to construct a trajectory connecting two states (initial state and terminal state) of a moving object such as a motor vehicle.

A "state" as used herein is meant to be a vector comprising the geometrical coordinates of the motor vehicle as it moves along the plane, a direction angle of the tangent, and the curvature of the path. In this definition, the path is a part of the object trajectory or, more precisely, the projection of the trajectory onto the two-dimensional plane of movement. To say it more figuratively, the path is the line connecting all geometrical coordinates of the moving object.

There are thus four general coordinates that can characterize a state $Z_i$ in the aforementioned sense:

$$z_i = [x_i, y_i, \psi_i, c_i] \quad (1)$$

As opposed to that, a coordinate point $P_i$ is only defined by its geometric coordinates:

$$P_i = [x_i, y_i] \quad (2)$$

where $x_i$, $y_i$ are the Cartesian coordinates of every point of a Cartesian coordinate axis system. The above state vector $Z_i$ comprises $\psi_i$ as the direction angle of the tangent and $c_i$ as the curvature of the path at point $P_i$.

A path connecting an initial state and a terminal state is normally made up of several elementary paths (or EPT for short) which, to simplify the model, are assumed to be of a uniform nature. This is to say that path planning solely works with elementary paths of the same kind.

In practice, path planning will be based around various types of elementary paths such as splines, polynomials, trigonometric functions or clothoids. A clothoid is a special type of plane curve that is marked by its curvature, c, changing in a linear manner.

The aforementioned elementary paths are mainly distinguished by their mathematical description. A feature that all elementary paths have in common is that they can be combined with straight and/or circular lines. In other words, straight and circular lines classify as special instances of tie elementary paths.

The path of a moving body is normally made up of a plurality of elementary paths that share the same junction points (abbreviating to JP). Thus, the junction points are special points of the path because each of them belongs to two adjoining elementary paths (EPT).

One special characteristic demanded of the paths by the system is that states must not change erratically along the entire course nor at the junction points. This is to say that the transition from one elementary path to an adjacent elementary path must be ensured to be continuous at the junction points of the standard path as well as both its first derivative (tangent) and its second derivative (curvature).

Thus, from the assumption that JP1 is a junction point of two elementary paths (EPT) of a length $s_i$ each and the further assumption that $\overline{F}_i(s)$ and $\overline{F}_{i+1}(s)$ are the vector functions made up of components (x, y) to describe the two adjacent elementary paths, the following equation is derived:

$$\lim_{\varepsilon \to 0} Z_i[\overline{F}_i(s_i - \varepsilon), \psi_i(s_i - \varepsilon), c_i(s_i - \varepsilon)] = \quad (3)$$
$$\lim_{\varepsilon \to 0} Z_{i+1}[\overline{F}_{i+1}(s_i + \varepsilon), \psi_{i+1}(s_i + \varepsilon), c_{i+1}(s_i + \varepsilon)]|$$

Equation (3) is the most crucial path planning constraint.

In technical applications such as the controlled maneuvering of a motor vehicle into or out of a parking space by means of a driver-assisting or parking assistant system, not only the constraints described by equation (3) but some further constraints must be met:

the coordinate axes (x, y) may need to have multiple limits to ensure that collisions are avoided, paying respect to technical feasibility, the curvature of path c and/or its time-based derivation dc/dt need to be limited by the steering apparatus of the motor vehicle.

These introductory remarks illustrate the complexity of path planning, particularly if all requirements and constraints are to be met.

The prior art, for example DE 29 01 504 B1 or DE 19 84 222 Al, presents various solutions based on path planning procedures.

Initially, some basic solutions exclusively worked with arcs and straight lines as the elementary pains of combined paths. However, this approach fails to meet the constraint described by equation (3).

To be able to meet the condition of continuous state transitions as described by equation (3), the aforementioned elementary paths in the shape of arcs and straight lines are optionally supplemented with splines, trigonometric functions, polynomial functions or clothoids.

The prior art prefers to base its path planning on clothoids because they are closely related to the rules of movement of steered motor vehicles. Clothoids have the added benefit of the length of the path being minimized when an initial state is connected with a terminal state.

The following equation describes the four state coordinates of an object moving along a clothoid path:

$$\frac{d}{ds}\begin{bmatrix} x \\ y \\ \psi \\ c \end{bmatrix} = \begin{bmatrix} \cos\psi \\ \sin\psi \\ c \\ k \end{bmatrix} \quad (4)$$

In the equation, s is again the path length, c is the curvature of the clothoid, $\psi$ is the track angle, and x and y are the Cartesian coordinates of a point on the path. The input variable of the state equation, i.e. parameter k, remains constant within a set section. It is often referred to as the "acuteness" of the clothoid.

Equation (4) shows that the state variables on an elementary clothoid path (ECPT) are always continuous functions with reference to s. Meeting the condition of continuous transitions at the junction points of a combined path remains to be a particular problem of path planning.

Using clothoids for path planning is discussed by a whole range of solution and approaches to solutions presented by the prior art as in Dubins: "On Curves of Minimal Length with a Constraint on Average Curvature, and with Prescribed Initial and Terminal Positions and Tangents", American Journal of Mathematics, Vol. LXXIX, 1957, D497-516; Souères and Laumond: "Shortest Paths synthesys for a Car-Like Robot", IEEE Trans. On Automatic Control, Vol. 41, No. 5, May 1996, p672-688.

However, the approaches to solutions presented by the prior art require very much computing power and are therefore of little use for practical applications.

An essential difficulty in the handling of clothoids is the fact a closed integration of equation (4) is not possible and that it would result in Fresnel's integrals.

German patent application DE 199 40 007 A1 describes how a series expansion of the cosine and sine functions results in the following approximate solution:

$$\begin{bmatrix} x(s) \\ y(s) \end{bmatrix} = \begin{bmatrix} \sum_{n=0}^{N} (-1)^n \frac{k^{2n} s^{4n+1}}{2^{2n}(4n+1)(2n)!} \\ \sum_{n=0}^{N} (-1)^n \frac{k^{2n+1} s^{4n+3}}{2^{2n+1}(4n+3)(2n+1)!} \end{bmatrix} \quad (5)$$

In this equation, the finite positive number $N<\infty$ is the degree of the approximate polynomials.

Equation (5) thus presents the elementary clothoid path (ECPT) in the parametric form of polynomials x(s) and y(s).

Despite the fact that the resulting polynomial functions allow a numerical computation of the path, they still leave path planners with the difficulty of not being a suitable means of systematic and analytic path planning.

This is where the current invention comes in.

The present invention has the task of providing a method of the aforementioned type which allows the use of clothoids and which minimizes the required computing power such that systematic path planning can also be done analytically.

The invention achieves this aim by a method defined by the elements characterizing claim 1 hereof. The ancillary claims describe some beneficial variants of the invention.

According to Claim 1, thee inventive method is characterized in that the path is allocated at least one isosceles triangle whose corners are $\Delta(P_0, P_3, P_5)|$ where Po is the starting position and P3 is the terminal position of at least one section of the path and where point P5 opposite the base of the planar triangle $\overline{P_0P_3}$ is the point where the two legs of the planar triangle, $\overline{P_0P_5}$ and $\overline{P_5P_3}$, meet such that the two legs $\overline{P_0P_5}$, $\overline{P_5P_3}$ are of identical length and, together with the side of the planar triangle $\overline{P_0P_3}$, form identical vertical angles ψ1, wherein angle ψ1 of the planar triangle at corner Po is formed by the angle between the tangent of the path and side $\overline{P_0P_3}$ of the triangle, and where the parameters of the planar triangle define the parameters of the elementary paths. Compared with the methods presented by the prior art, these measures help to greatly facilitate path planning. Using the inventive methods can be particularly helpful in easily and with little effort deriving the parameters required to describe the elementary path from the parameters of the planar triangle.

The path is preferably made up of at least two clothoids. Clothoids could be shown to be particularly suitable for path planning. An alternative option is to let the elementary paths comprise a trigonometric function and/or a polynomial function and/or a circular line and/or a spline.

An advantageous embodiment provides the option of adding at least one straight line and/or an arc to the path. The possibility of adding at least one circular line to the path is particularly advantageous when path planning gets to the maximum possible curvature of the path as set by the steering apparatus of the motor vehicle.

Specifically, the elementary paths in themselves can form a turning point at their junction. Or the elementary paths can be set to not form a turning point at their junction. Whether or not path planning is to include a turning point depends, among other things, from the way in which the motor vehicle is to be moved into the parking space.

An embodiment may intend to allocate an isosceles planar triangle to each of the symmetrical elementary paths and connect the planar triangles such that the two legs of each pair of adjoining planar triangles form a straight line in their common junction point.

The planar triangle are preferably joined by a straight line going through the junction points of the triangles such that the straight line extends the adjacent legs of the planar triangles.

The elementary path allocated to the planar triangles could be a symmetrical double clothoid for at least some of its length. This would further simplify path planning by means of the method presented herein.

In an advantageous embodiment, an isosceles planar triangle $\Delta(P_0, P_3, P_5)|$ is allocated to the symmetrical double clothoid such that the planar triangle is cut into two right triangles $\Delta(P_0, P_5, P_2)|$ and $\Delta(P_3, P_5, |P_2)$ by a bisecting line going through point P5, wherein the triangles $\Delta(P_0, P_5, P_2)|$ and $\Delta(P_3, P_5, P_2)$ have an angle ψ1 and identical major catheti $x_{01}=\overline{P_0P_2}=\overline{P_2P_3}|$ and each of the right triangles is allocated to one half of the symmetrical double clothoid. In an optional embodiment, the two clothoids may meet at a point P1 located on side $\overline{P_2P_5}|$ of the triangle and also connect points Po and P3 with point P1 such that the two clothoid paths have their maximum curvature $c1=P(\psi_1)/x_{01}|$ at junction point JP1.

A preferred embodiment assumes that the characteristic polynomial P(ψ2) of the clothoid path computes as $P(\psi_1) = 2\psi_1 \lfloor P_y(\psi_1) \mathrm{tg} \psi_1 + P_x(\psi_1) \rfloor \cos \psi_1$ and that equations $$P_x(\psi_1) = \sum_{n=0}^{N} (-1)^n \frac{\psi_1^{2n}}{(4n+1)(2n)!} \text{ and}$$

$$P_y(\psi_1) = \sum_{n=0}^{N} (-1)^n \frac{\psi_1^{2n+1}}{(4n+3)(2n+1)!} \text{ and}$$

$$P_y(\psi_1) = \sum_{n=0}^{N} (-1)^n \frac{\psi_1^{2n+1}}{(4n+3)(2n+1)!} \Bigg|$$

are calculus for polynomial functions Px and Py.

The method is based on the discovery that, compared with equation (5), a parametric form is a much simpler and much more advantageous way of expressing the elementary clothoid paths.

Start off with the equations valid for k=const.:

$$c\ ks \quad (6)$$

$$\psi = k\frac{s^2}{2} \quad (7)$$

Then take the following pair of equations $$\left.\begin{array}{l} \dfrac{k^{2n}s^{4n+1}}{2^{2n}} = s\psi^{2n} \\[6pt] \dfrac{k^{2n+1}s^{4n+3}}{2^{2n+1}} = s\psi^{2n+1} \end{array}\right| \quad (8)$$

and add them to equation (5). This will result in parametric polynomial functions $$\begin{bmatrix} x(s) \\ y(s) \end{bmatrix} = \begin{bmatrix} sP_x(\psi) \\ sP_y(\psi) \end{bmatrix} \quad (9)$$

which can be used to compute the two coordinates x(s) and y(s).

If N=3, an example of an approximate polynomial could look as follows:

$$\begin{bmatrix} P_x(\psi) \\ P_y(\psi) \end{bmatrix} = \begin{bmatrix} \displaystyle\sum_{n=0}^{3}(-1)^n\dfrac{\psi^{2n}}{(4n+1)(2n)!} \\[6pt] \displaystyle\sum_{n=0}^{3}(-1)^n\dfrac{\psi^{2n+1}}{(4n+3)(2n+1)!} \end{bmatrix}$$

$$= \begin{bmatrix} 1 - \dfrac{\psi^2}{10} + \dfrac{\psi^4}{216} - \dfrac{\psi^6}{9360} \\[6pt] \psi\left(\dfrac{1}{3} - \dfrac{\psi^2}{42} + \dfrac{\psi^4}{1320} - \dfrac{\psi^6}{75600}\right) \end{bmatrix} \quad (10)$$

Generally speaking, this approximation using N=3 will be sufficiently accurate for practical applications. A further developed method can also eliminate the unknown arc length from the two equations (9). The function described by the Cartesian coordinates of the path can then be written in a closed form as follows:

$$y = \frac{P_y(\psi)}{P_x(\psi)}x \quad (11)$$

It is obvious that the geometrical course of the path of an elementary clothoid path (ECPT) is computed using three state coordinates, x, y, $\psi$. The angle $\psi$ thus plays a very important role for the method presented herein.

Variables controlling the steering apparatus of the motor vehicle are preferably set by using the following formulae, i.e., $$s_{1i} = \frac{2\psi_i}{c_{i\,max}}; k_i = \frac{c_{i\,max}^2}{2\psi_i},$$

to compute the length s1i and the acuteness ki of the clothoids, where the arc length of the at least one arc computes as $$s_{ai} = 2\frac{\varphi_i - \psi_i}{c_{i\,max}}\bigg|.$$

An apparatus having the capability to carry out the method presented herein and suitable for being installed in a motor vehicle, can be designed as a hard-wired electronic unit. Specifically, the apparatus can be a fully programmable electronic unit.

The apparatus preferably actuates and controls paths that were previously computed and stored.

To add a beneficial option, the apparatus could be linked to a map of the near vicinity such that path planning can be based on the information of that map.

Preferably, the apparatus is the component part of a driver-assisting system.

DRAWINGS

The description of design variants below illustrate further features and benefits of the current invention with reference to the attached figures. The following is shown FIG. 1 illustrates the variables characterizing an asymmetrical double clothoid;

FIG. 2 shows the path of an asymmetrical double clothoid and its geometrical characteristics that would be used by an inventive method;

FIG. 3 illustrates the variables characterizing an elementary clothoid path and the symmetrical double clothoid derived from it;

FIG. 4 shows the path of an elementary clothoid path and a double clothoid derived from it;

FIG. 7 illustrates the clothoid function;

DESCRIPTION OF EMBODIMENTS

Figure 5:
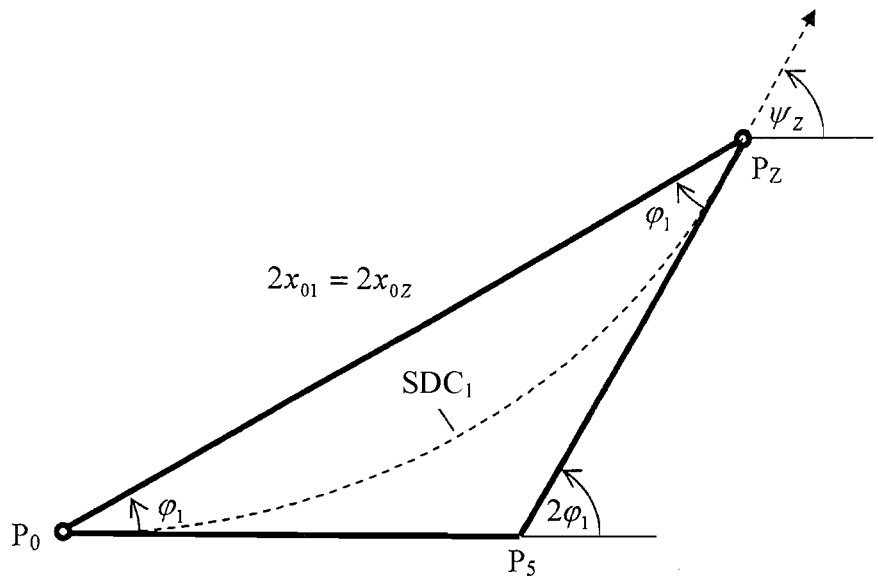
FIG. 5 shows a planar triangle of a symmetrical double clothoid.
Figure 6:
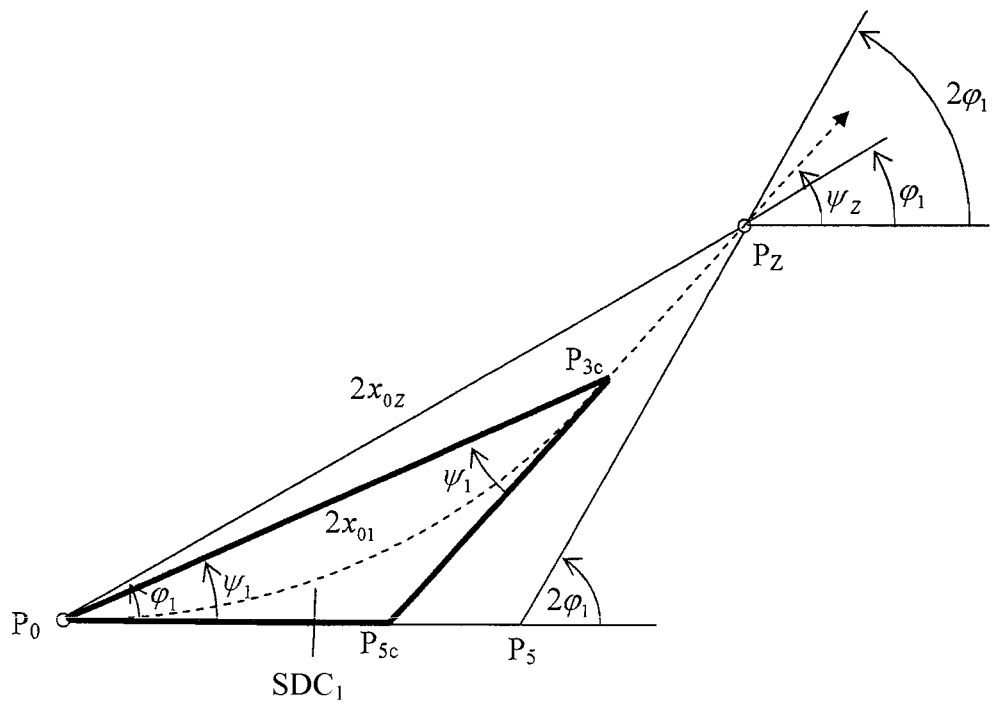
FIG. 6 shows a planar triangle comprising a path made up of a symmetrical double clothoid and a straight line.

The text below is a more detailed explanation of some key aspects of the inventive method of computing the path of a motor vehicle along a two-dimensional plane. The inventive method can be used in motor vehicles, for example, to judge whether the motor vehicle will fit into the parking space. An apparatus having the capability to carry out the method presented herein could be installed in a motor vehicle and is preferably a component part of a driver-assisting system. The method described below can be deployed to make the motor vehicle move in a manner controlled by a driver-assisting system or a parking assistant system.

First of all, the text discusses FIG. 1 and FIG. 2 showing two elementary clothoid paths of an acuteness k1 or k2 and a path length s1 or s2. To simplify further detailing, we will assume that a first elementary clothoid path ECPT1 as used for path planning starts at the origin of the coordinate axis system at point P0=[0, 0] and at a state Z0=[0, 0, 0, 0]. This first elementary clothoid path ECPT1 terminates at a point P1=[x1, y1]. At this point P1, the state of the first elementary clothoid path ECPT1 is Z1=[x1, y1, ψ1, c1]. At point P1, a second elementary clothoid path ECPT2 is attached to the first elementary clothoid path ECPT1 such that said second elementary clothoid path ECPT2 interconnects points P1=[x1, y1] and P3*=[x3*, y3*] or their corresponding states Z1=[x1, y1, ψ1, c1] and Z3=[x3*, y3*, ψ1+ψ2, 0].

To each of the elementary clothoid paths ECPT1 and ECPT2 shown in FIG. 2, a right-angled planar triangle (RAPT)Δ(P0, P2, P5) or Δ(P3*, P2*, P5*) is allocated. These two planar triangle have a base angle ψ1 or ψ2.

The bases of the two elementary clothoid paths ECPT1 and ECPT2 are formed by the major catheti $\overline{P_0P_2}$ or $\overline{P_2^*P_3^*}|$. The major catheti of the two planar triangles Δ(P0, P2, P5) and Δ(P3*, P2*, P5*) have a length x01 and x02.

The figure illustrates how, at junction point P1, the minor catheti $\overline{P_2P_5}$ and $\overline{P_2^*P_5^*}$ of the planar triangles are perpendicular to the tangent.

Looking at the course of the two elementary clothoid paths must bear in mind that the following relations apply in accordance with the aforementioned equations (6) and (7):

$$\frac{s_1}{\psi_1} = \frac{2}{c_1} \text{ and } \frac{s_2}{\psi_2} = \frac{2}{c_1} | \quad (12)$$

If k2>k1, s2 will be smaller than <s1 and ψ1 will be smaller than ψ1 while c will keep changing steadily.

The above equation (9) will result in the following:

$$x1 = s1 Px(\psi1) \quad (13)$$

$$y1 = s1 Py(\psi1) \quad (14)$$

The following geometrical connection:

$$\frac{x_{01}}{\cos\psi_1} - x_1 = y_1 ctg\left(\frac{\pi}{2} - \psi_1\right) \quad (15)$$

also applies.

The aforementioned equation (15) expresses the relation between base length x01 and arc length s1 of the elementary clothoid path ECPT1:

$$\frac{x_{01}}{s_1} = [P_y(\psi_1)tg\psi_1 + P_x(\psi_1)]\cos\psi_1 | \quad (16)$$

In this equation, arc length s1 is an unknown variable value.

However, equations (6) and (7) can be used to compute arc length s1:

$$s_1 = \frac{2\psi_1}{c_1} | \quad (17)$$

This allows arc length s1 to be eliminated from equation (16). What we get after the above operation is the basic equation of path planning by means of an elementary clothoid path (ECPT):

$$x_{01} = \frac{P(\psi_1)}{c_1} | \quad (18)$$

In the equation, P(ψ1) is the polynomial function characterizing the elementary clothoid path ECPT1. It looks as follows:

$$P(\psi_1) = 2\psi_1\lfloor P_y(\psi_1)tg\psi_1 + P_x(\psi_1)\rfloor \cos\psi_1| \quad (19)$$

One of the advantages is that the planar triangle Δ(P0, P2, P5) allocated to the first elementary clothoid path ECPT1 is fully defined by state Z1=[x1, y1, ψ1, c1] of the path at its terminal point P1.

Another advantage is that there is a comprehensive and obvious relation between the analytical and the geometrical presentation of the path.

The same applies to the second elementary clothoid path ECPT2, assuming that c2=c1:

$$x_{02} = \frac{P(\psi_2)}{c_1} \quad (20)$$

$$P(\psi_2) = 2\psi_2\lfloor P_y(\psi_2)tg\psi_2 + P_x(\psi_2)\rfloor\cos\psi_2| \quad (21)$$

In this case, ψ2 is a free parameter of this equation.

Analyzed below is a combined path PT made up of the first elementary clothoid path ECPT1 and the second elementary clothoid path ECPT2 and used to join states Z0=[0, 0, 0, 0] and Z3=[x3*, y3*, ψ1+ψ2, 0]. Analysis reveals that the coordinates of point P3*=[x3*, y3*] can be computed by means of the following equation:

$$\begin{bmatrix} x_3^* \\ y_3^* \end{bmatrix} = \begin{bmatrix} x_1 \\ y_1 \end{bmatrix} + \begin{bmatrix} \cos\psi_1 & -\sin\psi_1 \\ \sin\psi_1 & \cos\psi_1 \end{bmatrix}\begin{bmatrix} 2x_{02}\cos\psi_2 - x_2 \\ 2x_{02}\sin\psi_2 - y_2 \end{bmatrix}| \quad (22)$$

This calculus will also specify a value for ψ2.

To prevent overdetermination, either a column equation of equation (22) or distance:

$$d(x_1, y_1, x_{02}, x_2, y_2, \psi_1, \psi_2) = \sqrt{(x_3^*)^2 + (y_3^*)^2}| \quad (23)$$

must be taken into account

Furthermore, there is a set connection between the analytical and the topographic presentation of the path planning. Systems of equations (18) to (22) and (18) to (21) plus (23) can be solved by means of numerical methods only.

The same approach applies to solving the problem that k2<k1 and, therefore, s2>s1 and $\psi 2 < \psi 1$.

Is is of a particular advantage if the two elementary clothoid paths ECPT1 and ECPT2 are mirror-inverted, i.e. if $\psi 1 = \psi 2$. In consequence, the two elementary clothoid paths ECPT1 and ECPT2 have identical path lengths (i.e. s1=s2 and x01=x02). This case is the dashed line in FIG. 2 which will be discussed in detail with reference to FIG. 3 and FIG. 4.

FIG. 4 shows two elementary clothoid paths, ECPT1 and ECPT2, whose clothoid acuteness k is set by k=k1 and k=k1 as shown in FIG. 3. The result is a symmetrical double clothoid (SDC) connecting point P0=[0, 0] with point P3=[x3, y3] and the relevant state Z0=[0, 0, 0, 0] with state Z3=[x3, y3, 2$\psi$1, 0]. Target coordinates x3, y3 therefore compute as follows:

$$x_3 = 2x_{01}\cos\psi_1 = \frac{2}{c_1}P(\psi_1)\cos\psi_1 \quad (24)$$
$$y_3 = 2x_{01}\sin\psi_1 = \frac{2}{c_1}P(\psi_1)\sin\psi_1$$

Apart from the above, parameters x1, y1, x01 can be computed using equations (13) to (19).

Systems of equations (13) to (19) and (24) allow path planners to carry out the following essential tasks involved in maneuvering a motor vehicle into a parking space:
 Calculation of the length of way 2x01 traveled between the starting and terminal points P0=[0, 0] or P3=[x3, y3] where the change in path direction 2$\psi$1 is set and the maximum curvature of path is c1;
 Calculation of the actual terminal path direction 2$\psi$1 where the length of way 2x01 to be traveled is set and the maximum curvature of path is c1;
 Calculation of the maximum actual curvature c1 as dependent on the two other target parameters, 2x01 and 2$\psi$1.

Now path planning can be done by joining the bases of isosceles planar triangles either directly of using combined straight lines such that the curvature of the path does not change at the junction points. Each of the planar triangles is allocated a symmetrical double clothoid (SDC).

The examples shown in FIG. 3 to 6 illustrate that each of the symmetrical double clothoids SDC1 is determined by two parameters, i.e. $\psi$i and $\psi$0i. Just as with the elementary clothoid path ECPT, these two parameters are represented by the following equation in accordance with equation (18):

$$c_i x_{0i} = P(\psi_i) \quad (25)$$

If two of the three parameters ci, x0i, $\psi$i are set, path planning is simply achieved by solving this equation.

Polynomial P($\psi$i) obviously has a crucial function for planning the course of the path of a controlled motor vehicle. FIG. 7 plots the course of polynomial P($\psi$i). Due to this polynomial P($\psi$i) being non-monotonous, this function is particularly well suited for an iterative solution as long as $\psi 1 < 1,22$ rad($\approx 70°$). This range is accurate enough for most technical applications.

If the geometrical coordinates x0i, $\psi$i are set, the maximum curvature of the path, ci, computes as:

$$c_i = \frac{P(\psi_i)}{x_{0i}}| \quad (26)$$

Planning a path under realistic ambient conditions must consider the important case of the maximum curvature of the path being limited by a maximum steering angle of the motor vehicle's steering mechanism, for example. The following applies:

$$c_i \leq c_{imax} \quad (27)$$

This constraint is of particular importance if the driver-assisting system is to maneuver the motor vehicle into a comparatively short parking space. As the vehicle drives along the target path, it reaches the maximum steering angle of the motor vehicle's steering mechanism and, thus, the maximum curvature of oath PT. In consequence, two elementary clothoid paths, ECPT1 and ECPT2, are connected by the circular line (CL).

There is a possibility of making up the clothoid paths by joining both symmetrical and asymmetrical elementary clothoid paths (ECPT) which are used for path planning. In order to minimize the required computing capacity, it is still advantageous to just use symmetrical double clothoids (SDC).

Figure 8:
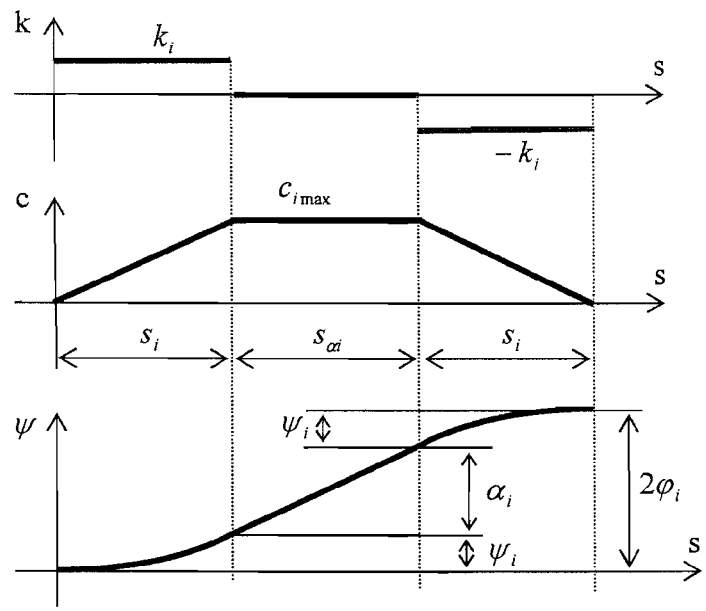
FIG. 8 illustrates the characteristic variables needed for planning a path of limited curvature.

FIG. 8 plots the course of basic variables of the i'th planar triangle. The path has its maximum curvature, $c = c_{imax}$, after a path length si. The remaining course along a path length s$\alpha$i corresponds to a circular line of the following radius $$R_{imin} = \frac{1}{c_{imax}}| \quad (28)$$

The circular line is followed by the second elementary clothoid path, ECPT2. To compute the aperture angle of the circular line equation:

$$\alpha_i = \frac{s_{\alpha i}}{R_{imin}} \quad (29)$$

can be used.

One ensuing objective is to take the given target coordinates (distance $2x_{0z}$ and change in path direction $\psi_{zi} = 2\psi_i$) and the given maximum curvature $c_{imax}$ as set by the maximum steering angle of the motor vehicle's steering mechanism and compute the base angle of the clothoid, $\psi$i, in the range $0 \leq \psi_i \leq \psi_i$, that is to say, to connect the initial and terminal states:

$$z_0 = [0, \quad 0, \quad 0, \quad 0], \quad (30)$$
$$z_Z = [x_{31}, \quad y_{31}, \quad \psi_{Zi}, \quad 0]$$

taking constraint $$c_i \leq c_{imax} \quad (31)$$

into account.

It takes the following steps to plan the path of the motor vehicle:

1. The following equations ace taken to derive the parameters of a symmetrical double clothoid from the set path planning targets:

$$\varphi_i = \frac{\psi_{Zi}}{2} \quad (32)$$

$$x_{0Z} = \frac{\sqrt{x_{3i}^2 + y_{3i}^2}}{2}$$

$$c_i = \frac{P(\varphi_i)}{x_{0Z}}$$

2. If $$\frac{P(\varphi_i)}{x_{0Z}} \leq c_{imax}, \quad (33)$$

a circular line need not be added to the path.

3. If $$\frac{P(\varphi_i)}{x_{0Z}} > c_{imax}, \quad (34)$$

a circular line needs to be added to limit the curvature ci of the path.

Figures 9, 10:
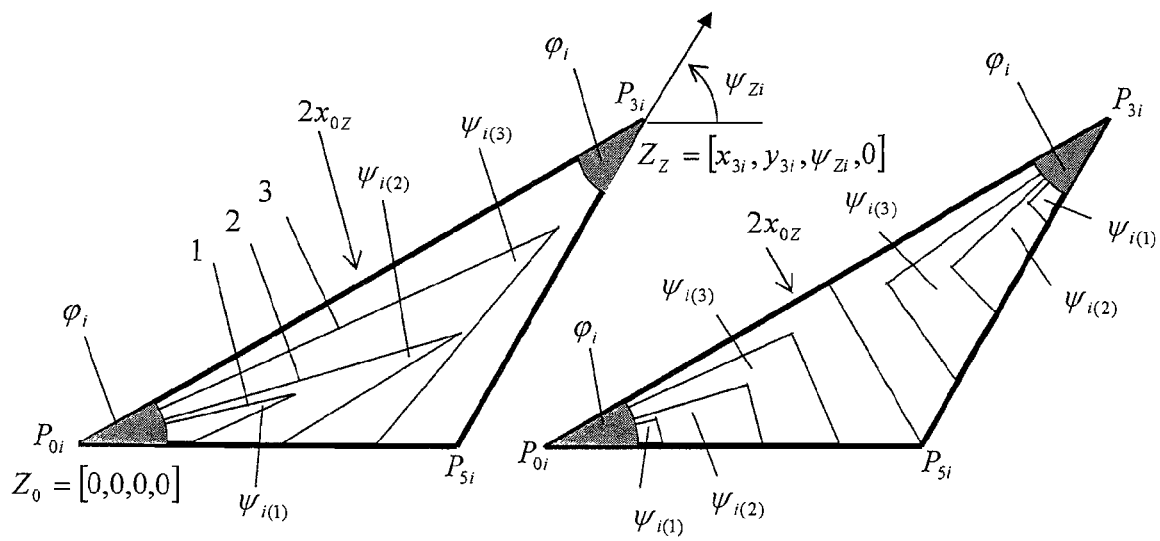
FIG. 9, 10 illustrate a planar triangle with a base triangle allocated to the clothoids.

FIG. 9 and FIG. 10 are taken to illustrate the details of this approach. Start with an isosceles planar triangle Δ(P0i, P3i, P5i) with a base angle ψi and a base of a length 2x0Z.

Within planar triangle Δ(P0i, P3i, P5i) there are three triangles, 1, 2 and 3, which show examples of three new planar triangles for symmetrical double clothoids with base angles $\psi_{i(1)} < \psi_{i(2)} < \psi_{i(3)} < \varphi_i$ (see FIG. 9).

Figure 11:
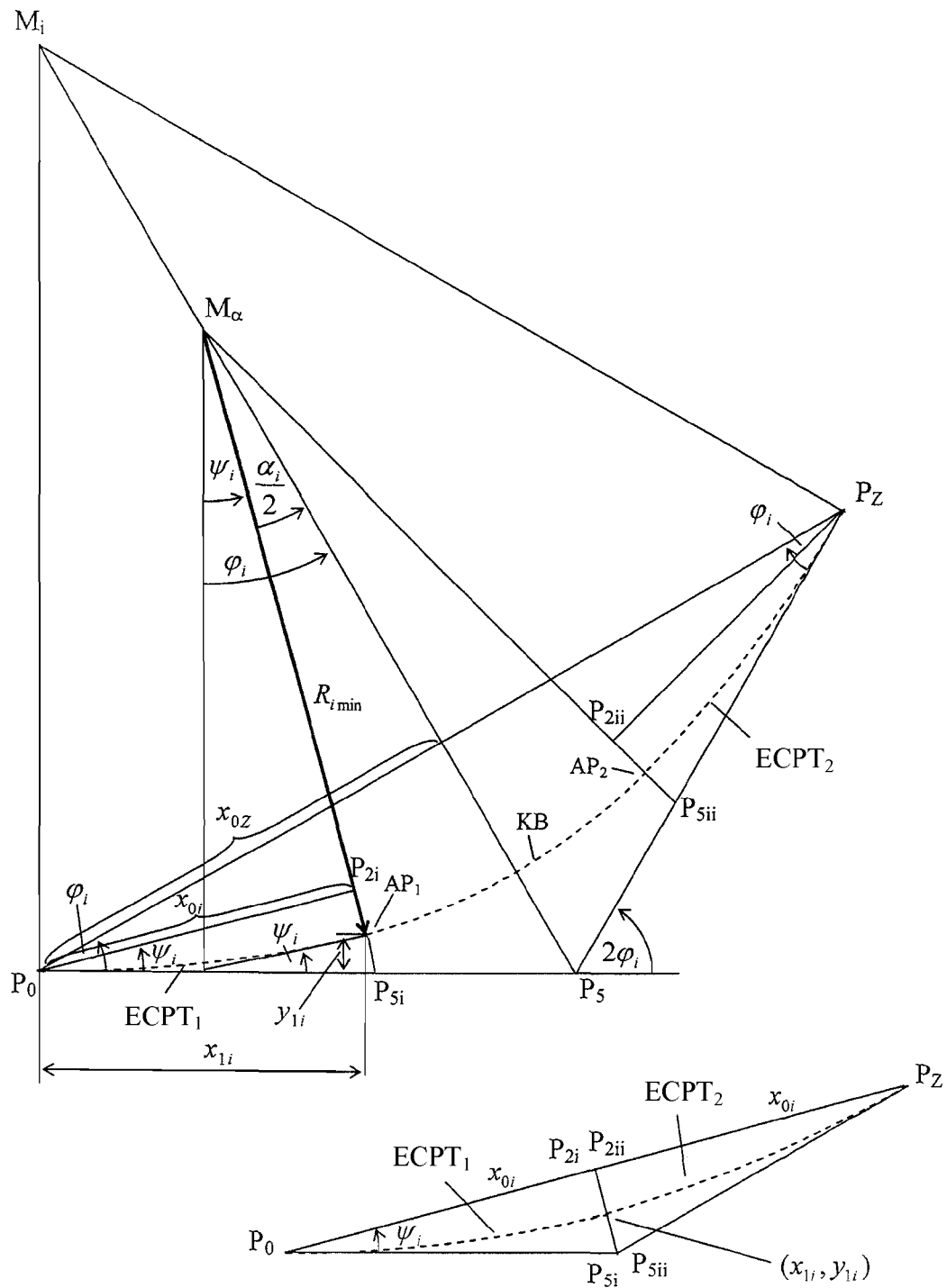
FIG. 11 is a planar triangle of two elementary clothoid paths joined to one another to limit the curvature of the path.

Each of the three inner planar triangles 1, 2, 3 has its own bisecting line which cuts them in half together with the symmetrical double clothoid (SDC) allocated to each of them. The cut-off second half of planar triangles 1, 2, 3 is then moved to the vertex P3i of planar triangle Δ(P0i, P3i, P5i) as illustrated in FIG. 10. Cutting the symmetrical double clothoids in half yields elementary clothoid paths ECPT1 and ECPT2 are then connected by a circular line (CL) which joins them up at junction points JP1 and JP2 as shown in FIG. 11. The mid-point of the circular line is labeled Mα.

In this case, the following groups of equations apply:

$$\alpha_i + 2\psi_i = 2\varphi_i \quad (35)$$

$$\begin{bmatrix} x_{3i} \\ y_{3i} \end{bmatrix} = \begin{bmatrix} x_{1i} \\ y_{1i} \end{bmatrix} + \quad (36)$$
$$\frac{1}{c_{imax}} \begin{bmatrix} \sin(\alpha_i + \psi_i) - \sin\psi_i \\ \cos\psi_i - \cos(\alpha_i + \psi_i) \end{bmatrix} + \begin{bmatrix} \cos\alpha_i & -\sin\alpha_i \\ \sin\alpha_i & \cos\alpha_i \end{bmatrix} \begin{bmatrix} 2x_{0i}\cos\psi_i - x_{1i} \\ 2x_{0i}\sin\psi_i - y_{1i} \end{bmatrix}$$

$$x_{0i} = \frac{P(\psi_i)}{c_{imax}} \quad (37)$$

$$x_{1i} = \frac{2\psi_i}{c_{imax}} P_x(\psi_i), \quad y_{1i} = \frac{2\psi_i}{c_{imax}} P_y(\psi_i) \quad (38)$$

Eliminating all of the auxiliary variables leaves the following transcendental equation:

$$F(x_{0z}, \varphi_i, c_{imax}, \psi_i) = 0 \quad (39)$$

In this equation, ψi is the unknown variable and x0z, φi, cimax are parameters. Solving the transcendental equation (39) is a way of numerically computing the unknown variable ψi.

Obviously and similar to the case where the curvature ci of the path is not limited, the key path planning parameters are again set by the base angle ψi of the elementary clothoid path.

4. The fundamental equations of the elementary clothoid paths (ECPT1, ECPT2) are then taken to compute the quantities relevant to the steering mechanism of the motor vehicle.

$$s_{1i} = \frac{2\psi_i}{c_{imax}}; \quad k_i = \frac{c_{imax}^2}{2\psi_i} \quad (40)$$

$$s_{\alpha i} = \frac{\alpha_i}{c_{imax}} = 2\frac{\varphi_i - \psi_i}{c_{imax}} \quad (41)$$

5. A last step of the procedure applies to joined paths having at least one turning point and is comprised of computing the free parameters, x01/x03.

Figure 12:
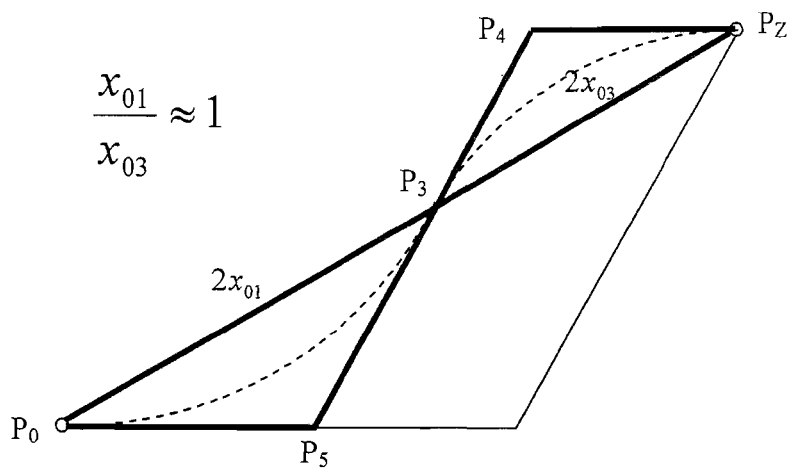
FIG. 12-14 show courses of the assembled path after changing the ratio of clothoid base lengths.
Figure 13:
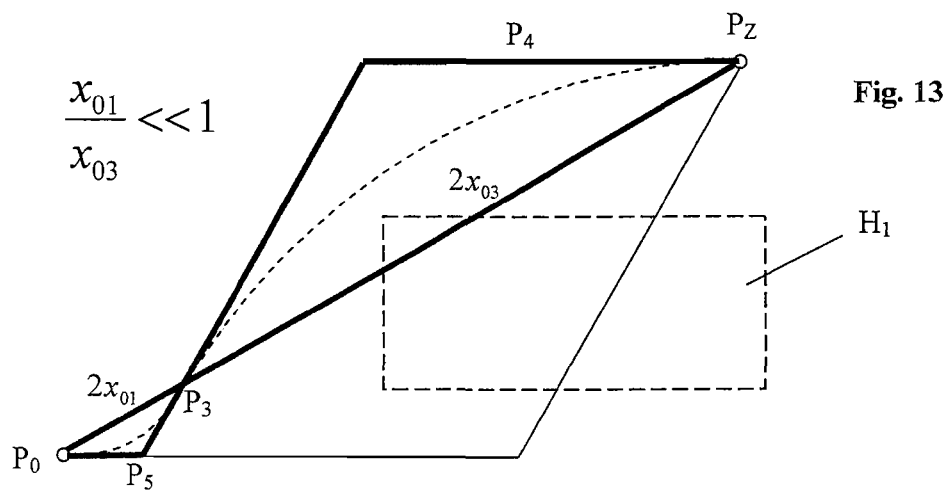
Figure 14:
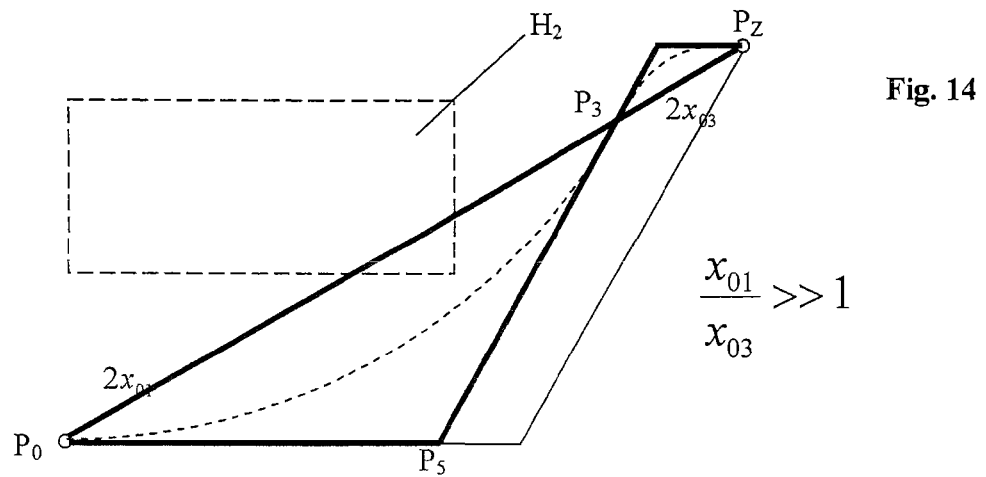

FIG. 12 to FIG. 14 show typical examples of paths including a turning point. If possible, the ratio of x01/x03 is set to an optimized value, preferably to a ratio of x01/x03~1. This is particularly advantageous because it will generate a symmetrical steering load.

FIG. 13 and FIG. 14 show two examples of paths with a turning point where the optimum ratio of x01/x03~1 is not obtainable.

In FIG. 13, base length x01 is a lot shorter than base length x03 and in FIG. 14, x01 is much longer than x03. The situations shown in FIGS. 13 and 14 are particularly prone to occur if a collision with obstacles H1, H2—objects or vehicles in the parking space, for example—is to be avoided while moving the vehicle into toe parking space. The ratio of x01/x03 has an upper and/or lower limit. These two limits result from the fact that the length of the clothoid also becomes smaller in the diminishing planar triangle. The minimum length of the clothoid is also a general limit to the system.

Figure 15:
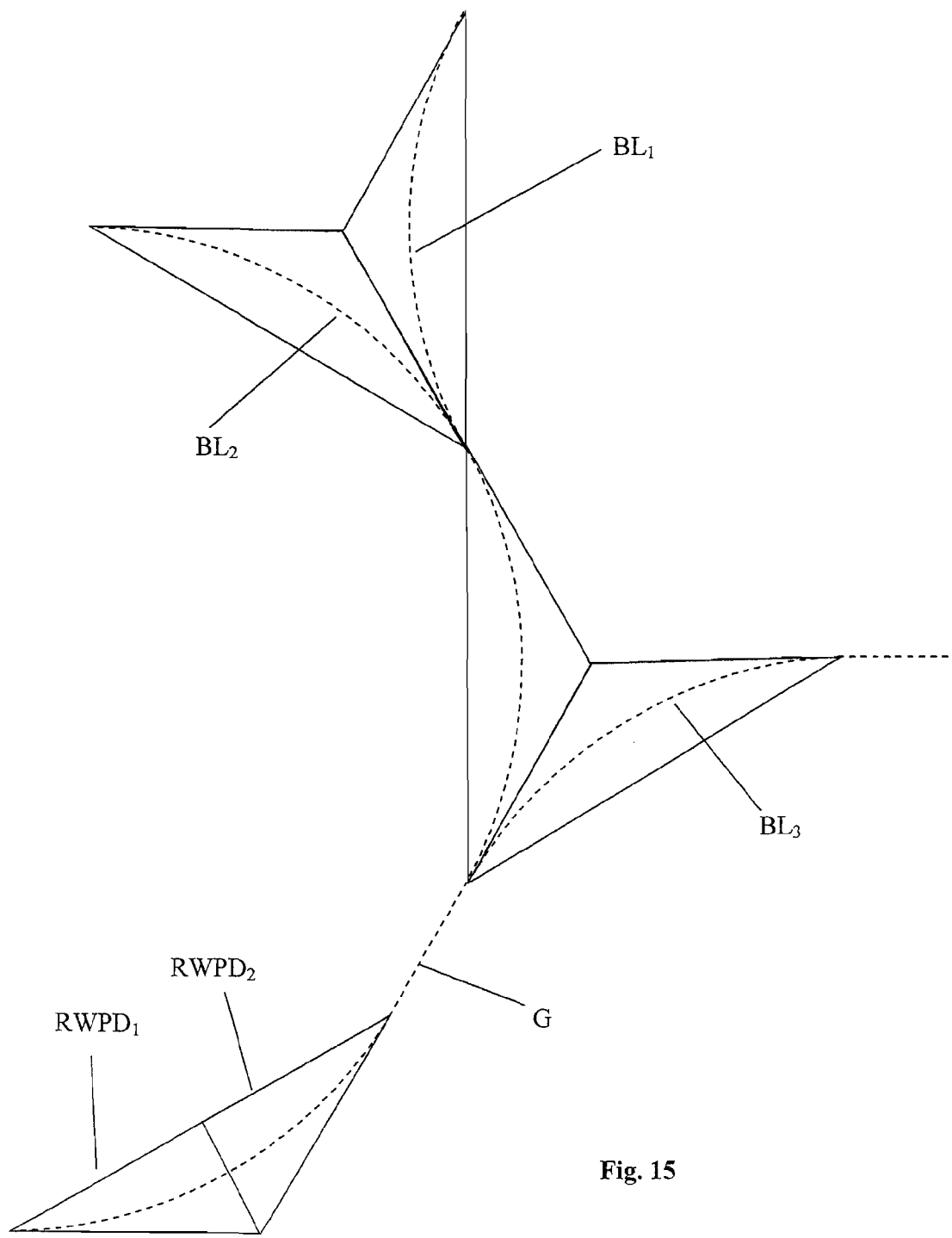
FIG. 15 is the schematic illustration of a path planning method in accordance with a second embodiment of the present invention constructed of joined isosceles planar triangles and/or of added straight lines.

FIG. 15 illustrates that the planar triangles can be joined in an almost entirely arbitrary manner.

In an important application of the path planning method of driving a motor vehicle into and out of a parking space as presented herein, it is of particular importance that the suitability of the parking space for parking the motor vehicle in it can be recognized comparatively quickly. The aim is to use all suitable parking spaces if possible, but also to only use the parking spaces within set limiting constraints.

Figure 16:
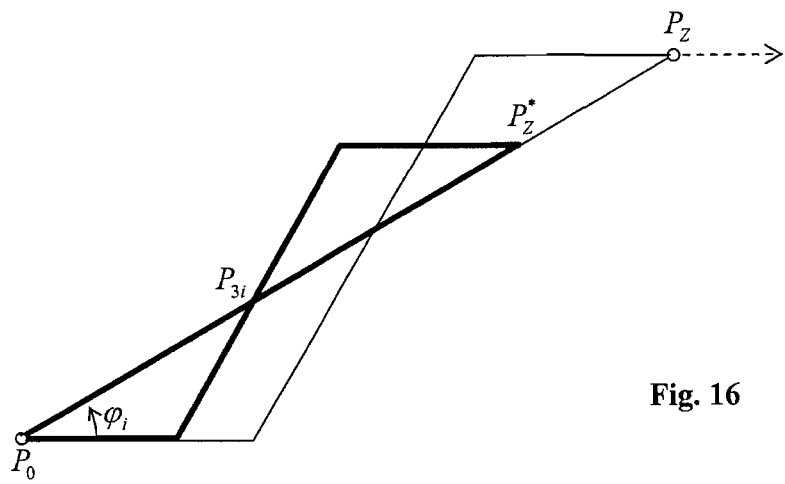
FIG. 16 is the schematic illustration of how the method presented herein is used to decide whether a parking space has the correct size for maneuvering a motor vehicle into it.

A parking space classifies as suitable for parking a motor vehicle if at least the minimum length of the clothoid path and/or the maximum curvature of the path allows the driving into and in the parking space without collisions. This is explained with reference to FIG. 16 here below. Equations (35) to (38) are set such that the initial and terminal states are given which, consequently, sets the values of parameters x0i, φi of the planar triangle. Assuming that the maximum curvature of the path ci,max and the minimum length of the clothoid path si,min are given, the latter being approximately the same as x0i, equations (35) and (37) can be used to compute the angle parameters αi and ψi. Equation (36) then allows to compute the coordinates of point Pz*. A parking space is a suitable parking space if point Pz* is located on line $\overline{P_0 P_z}$ which connects the initial state and the terminal state.

Compared with the prior art, the method presented herein provides the following advantages:

The clothoids are included in path planning.

The method presents a systematic approach.

Pre-setting the terminal state and/or the free parameter (length of base or separation of the lengths of the two bases of the planar triangles belonging together) allows the taking into account of further constraints such as optimizing, avoiding collisions, verification of suitability of parking space, and so forth.

The invention claimed is:

1. A method of computing the path of a motor vehicle along a two-dimensional plane required to control the motion of the motor vehicle by means of a driver-assisting system, comprising:

providing a path connecting an initial state with a terminal state wherein each of states $Zi=[xi, yi, \psi i, ci]$ along the path is characterized by four state coordinates with xi and yi being the Cartesian coordinates of a point Pi, $\psi i$ being the direction angle of the tangent, and ci being the curvature of the path at point Pi;

assembling the path from a number of elementary paths joining at junction points JPi such that the four state coordinates of state Zi have a continuous transition in the junction points JPi;

assigning the path at least one isosceles planar triangle with vertices $\Delta(P0, P3, P5)$, where P0 is the starting position and P3 is terminal position of at least a section of the path;

determining where point P5 is located opposite the base of the planar triangle $\overline{P_0P_3}$ by the intersection of the two legs $\overline{P_0P_5}$ and $\overline{P_5P_3}$ of the planar triangle such that the two legs $\overline{P_0P_5}, \overline{P_5P_3}$, are of the same length and, together with side $\overline{P_0P_3}$ of the planar triangle, form the same vertical angle $\psi i$, with angle $\psi i$ at vertex P0 of the planar triangle by the angle formed by the tangent of the path and side $\overline{P_0P_3}$ of the triangle;

determining the parameters of the elementary paths by the parameters of the planar triangle; and signaling a control setting of a vehicle steering mechanism according to said determinations.

2. The method of claim 1 wherein the path is assembled from at least two clothoids.

3. The method of claim 1 wherein at least one straight line and/or at least one circular line are added to the path.

4. The method of claim 1 wherein at least some of the path is assembled from symmetrical elementary paths.

5. The method of claim 4, wherein an isosceles planar triangle is allocated to each of the symmetrical elementary paths and that the planar triangles are joined such that the two sides of any two adjoining planar triangles form a straight line in the shared junction point.

6. The method of claim 5, wherein the planar triangles are joined by a straight line going through the junction points such that the straight line extends the adjacent legs of the planar triangles.

7. The method of claim 1 wherein at least some section of the elementary path is a symmetrical double clothoid.

8. The method of claim 7, wherein the symmetrical double clothoid is assigned an isosceles planar triangle $\Delta(P0, P3, P5)$ that is cut into two right triangles $\Delta(P0, P5, P2)$ and $\Delta(P3, P5, P2)$ by a bisecting line going through point P5 such that the triangles $\Delta(P0, P5, P2)$ and $\Delta(P3, P5, P2)$ share angle $\psi 1$ and identical major catheti $x01=\overline{P_0P_2}=\overline{P_2P_3}$ and that each of the right triangles is allocated to one half of the symmetrical double clothoid.

9. The method of claim 8, wherein the two clothoids meet in a point P1 on side $\overline{P_2P_5}$ and also connect points P0 and P3 with point P1 such that the two clothoid paths have their maximum curvature $c1=P(\psi 1)/x01$ at junction point JP1.

10. The method of claim 1 wherein the polynomial $P(\psi 1)$ characterizing the clothoid path computes as $P(\psi_1)=2\psi_1\lfloor P_y(\psi_1)tg\psi_1+P_x(\psi_1)\rfloor \cos\psi_1$ and that equations $$P_x(\psi_1) = \sum_{n=0}^{N}(-1)^n \frac{\psi_1^{2n}}{(4n+1)(2n)!} \text{ and}$$

$$P_y(\psi_1) = \sum_{n=0}^{N}(-1)^n \frac{\psi_1^{2n+1}}{(4n+3)(2n+1)!}$$

can be used to compute the polynomial functions Px and Py.

11. The method of claim 1, wherein variables controlling the motor vehicle's steering mechanism are set by using the following formulae, i.e.

$$s_{1i}=\frac{2\psi_i}{c_{imax}}; k_i=\frac{c_{imax}^2}{2\psi_i}$$

to compute the length s1i and the acuteness ki of the clothoids, where the arc length of the at least one arc is expressed as the relation $$S_{ai}=2\frac{\varphi_i-\psi_i}{c_{imax}}.$$

12. A processor configured to compute the path of a motor vehicle along a two-dimensional plane, comprising:

said processor being configured to provide a path connecting an initial state with a terminal state wherein each of states $Zi=[xi, yi, \psi i, ci]$ along the path is characterized by four state coordinates with xi and yi being the Cartesian coordinates of a point Pi, $\psi i$ being the direction angle of the tangent, and ci being the curvature of the path at point Pi;

said processor being further configured to assemble the path from a number of elementary paths joining at junction points JPi such that the four state coordinates of state Zi have a continuous transition in the junction points JPi;

said processor being further configured to assign the path at least one isosceles planar triangle with vertices $\Delta(P0, P3, P5)$, where P0 is the starting position and P3 is terminal position of at least a section of the path;

said processor being further configured to determine where point P5 is located opposite the base of the planar triangle $\overline{P_0P_3}$ by the intersection of the two legs $\overline{P_0P_5}$ and $\overline{P_5P_3}$ of the planar triangle such that the two legs $\overline{P_0P_5}, \overline{P_5P_3}$ are of the same length and, together with side $\overline{P_0P_3}$ of the planar triangle, form the same vertical angle $\psi i$;

said processor being further configured to determine angle $\psi i$ at vertex P0 of the planar triangle by the angle formed by the tangent of the path and side $\overline{P_0P_3}$ of the triangle, such that the parameters of the elementary paths are determined by the parameters of the planar triangle; and said processor being further configured to signal to a vehicle steering mechanism a setting according to said determinations.

13. The processor of claim 12 wherein the path is assembled from at least two clothoids.

14. The processor of claim 12 wherein an isosceles planar triangle is allocated to each of the symmetrical elementary paths and that the planar triangles are joined such that the two sides of any two adjoining planar triangles form a straight line in the shared junction point.

15. The processor of claim 12 wherein the planar triangles are joined by a straight line going through the junction points such that the straight line extends the adjacent legs of the planar triangles.

16. The processor of claim 12 wherein at least some section of the elementary path is a symmetrical double clothoid.

17. The processor of claim 12 wherein the symmetrical double clothoid is assigned an isosceles planar triangle $\Delta(P0, P3, P5)$ that is cut into two right triangles $\Delta(P0, P5, P2)$ and $\Delta(P3, P5, P2)$ by a bisecting line going through point P5 such that the triangles $\Delta(P0, P5, P2)$ and $\Delta(P3, P5, P2)$ share angle $\psi 1$ and identical major catheti $x01=|\overline{P_0P_2}=\overline{P_2P_3}|$ and that each of the right triangles is allocated to one half of the symmetrical double clothoid.

18. The processor of claim 12 wherein the two clothoids meet in a point P1 on side $\overline{P_2P_5}$ and also connect points P0 and P3 with point P1 such that the two clothoid paths have their maximum curvature $c1=P(\psi 1)/x01$ at junction point JP1.

19. The processor of claim 12 wherein the polynomial $P(\psi 1)$ characterizing the clothoid path computes as $P(\psi_1)=2\psi_1[P_y(\psi_1)tg\psi_1+P_x(\psi_1)]\cos\psi_1$ and that equations $$P_x(\psi_1) = \sum_{n=0}^{N} (-1)^n \frac{\psi_1^{2n}}{(4n+1)(2n)!} \text{ and}$$

$$P_y(\psi_1) = \sum_{n=0}^{N} (-1)^n \frac{\psi_1^{2n+1}}{(4n+3)(2n+1)!}$$

can be used to compute the polynomial functions Px and Py.

20. The processor of claim 12 wherein variables controlling the motor vehicle's steering mechanism are set by using the following formulae, i.e.

$$S_{1i} = \frac{2\psi_i}{c_{imax}}; \quad k_i = \frac{c_{imax}^2}{2\psi_i},$$

to compute the length s1i and the acuteness ki of the clothoids, where the arc length of the at least one arc is expressed as the relation $$s_{\alpha_i} = 2\frac{\varphi_i - \psi_i}{c_{imax}}.$$

* * * * *